United States Patent
Dong et al.

(10) Patent No.: US 9,240,152 B2
(45) Date of Patent: Jan. 19, 2016

(54) ARRAY SUBSTRATE AND LIQUID CRYSTAL DISPLAY PANEL AND DRIVING METHOD THEREOF

(71) Applicant: SHENZHEN CHINA STAR OPTOELECTRONICS TECHNOLOGY CO. LTD., Shenzhen, Guangdong (CN)

(72) Inventors: Chengcai Dong, Shenzhen (CN); Je-Hao Hsu, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/240,359

(22) PCT Filed: Jan. 17, 2014

(86) PCT No.: PCT/CN2014/070758
§ 371 (c)(1),
(2) Date: Feb. 21, 2014

(87) PCT Pub. No.: WO2015/096235
PCT Pub. Date: Jul. 2, 2015

(65) Prior Publication Data
US 2015/0179114 A1 Jun. 25, 2015

(30) Foreign Application Priority Data
Dec. 25, 2013 (CN) .......................... 2013 1 0729283

(51) Int. Cl.
*G09G 3/36* (2006.01)
*G02F 1/1368* (2006.01)
(Continued)

(52) U.S. Cl.
CPC ............ *G09G 3/3614* (2013.01); *G02F 1/1365* (2013.01); *G02F 1/1368* (2013.01);
(Continued)

(58) Field of Classification Search
CPC .............. G09G 3/3614; G09G 3/3648; G09G 2300/043; G09G 2300/0809; G09G 2310/0251; G09G 2320/0242; G09G 2320/0257; G09G 2310/0262; G09G 2320/028; G02F 1/133514; G02F 1/13624; G02F 1/136286; G02F 1/1365; G02F 1/1368
USPC ........ 345/54, 79, 87–104, 204–214, 690–699
See application file for complete search history.

(56) References Cited

U.S. PATENT DOCUMENTS

2006/0274008 A1* 12/2006 Lin et al. .......................... 345/92
2007/0064182 A1* 3/2007 Lin et al. ........................ 349/114
(Continued)

FOREIGN PATENT DOCUMENTS

CN 103454823 A 12/2013

OTHER PUBLICATIONS

International Search Report dated Oct. 13, 2014, issued to International Patent Application No. PCT/CN2014/070758.

*Primary Examiner* — Dmitriy Bolotin
(74) *Attorney, Agent, or Firm* — Stein IP, LLC (57) ABSTRACT

The present disclosure provides an array substrate and liquid crystal display panel, and a driving method thereof, wherein each pixel unit of the array substrate includes a compensation circuit unit. When proceeding in the direction of scanning and when there is a scanning signal on a scanning line related to a pixel unit in the next row of a present pixel unit, the compensation circuit of the present pixel unit works on a sub electrode of the present pixel unit, such that a ratio of the voltage difference between the sub electrode and a common electrode to the voltage difference between a main electrode and the common electrode during a positive polarity inversion driving period equals a ratio of the voltage difference between the sub electrode and the common electrode to the voltage difference between the main electrode and the common electrode during a negative polarity inversion driving period. By means of the above, the liquid crystal display panel according to the present disclosure can obtain the effect of reduced color shift.

11 Claims, 4 Drawing Sheets

(51) Int. Cl.
   *G02F 1/1365*  (2006.01)
   *G02F 1/1362*  (2006.01)
   *G02F 1/1335*  (2006.01)
(52) U.S. Cl.
   CPC ...... *G02F1/13624* (2013.01); *G02F 1/133514* (2013.01); *G02F 1/136286* (2013.01); *G09G 3/3648* (2013.01); *G09G 2300/043* (2013.01); *G09G 2300/0809* (2013.01); *G09G 2310/0251* (2013.01); *G09G 2310/0262* (2013.01); *G09G 2320/028* (2013.01); *G09G 2320/0242* (2013.01); *G09G 2320/0257* (2013.01)

(56) References Cited

U.S. PATENT DOCUMENTS

| | | | |
|---|---|---|---|
| 2008/0284931 A1* | 11/2008 | Kimura | 349/39 |
| 2011/0170029 A1* | 7/2011 | Kimura | 349/38 |
| 2012/0212686 A1* | 8/2012 | Kimura | 349/42 |

* cited by examiner

ARRAY SUBSTRATE AND LIQUID CRYSTAL DISPLAY PANEL AND DRIVING METHOD THEREOF

FIELD OF THE INVENTION

The present disclosure relates to a liquid crystal display technology, more particularly to an array substrate and liquid crystal display panel, and a driving method thereof.

BACKGROUND OF THE INVENTION

Recently, a thin film transistor liquid crystal display panel (TFT LCD) has already become the mainstream product in the market with its outstanding performance. The thin film transistor liquid crystal display panel is mainly composed of an array substrate, a color filter substrate, and a liquid crystal layer. On the array substrate, there are a plurality of thin film transistors arranged in the form an array and pixel units configured to correspond to said thin film transistors. The thin film transistor, as a switch element to actuate the pixel unit's execution, receives a scanning signal from a scan driving circuit via a scanning line, and a data signal from a data driving circuit via a data line, and writes the data signal into the pixel unit under the action of the scanning signal, such that respective liquid crystal molecules of the pixel unit occur corresponding deflection under the influence of the data signal, which causes a certain amount of light to get through.

With respect to the thin film transistor liquid crystal panel of a type of vertical alignment (VA), there is prevalence of the color shift problem. This is because the effective refractive index of the liquid crystal molecules varies with different viewing angles, which thereby causes the change in the intensity of transmitted light. It is specifically manifested in that, light transmission capability reduces under an oblique viewing angle, and color inconsistency is presented in the directions from the oblique viewing angle to the front viewing angle, and especially, a significant color distortion may be observed over a wide viewing angle. Accordingly, one of the important research and development topics of the LCD panel technology is how to achieve a lower color shift.

Figure 1:
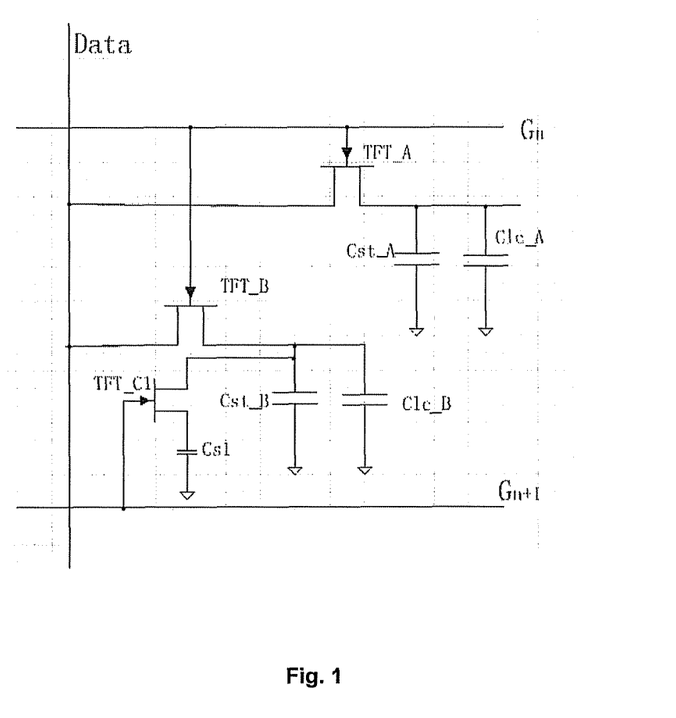
FIG. 1 is a schematic diagram of an equivalent circuit of a pixel unit using the charge sharing technique in the prior art.

So far, the mainstream LCD panel manufacturers have generally applied a charge sharing technology to solve these problems. FIG. 1 is a diagram of an equivalent circuit of one unit pixel in the liquid crystal panel display using said charge sharing technique. The pixel electrodes of each pixel unit include two portions, i.e., a main-area electrode and a sub-area electrode, wherein the main-area electrode is driven by a thin film transistor TFT_A; and the sub-area electrode is driven by a thin film transistor TFT_B. The main and sub area electrodes are respectively applied with different voltage levels while they are driven by a voltage of the same gray scale, such that a gray scale curve to be combined with both areas over a wide viewing angle presents a decreased difference from that over the front viewing angle, whereby the color shift problem caused by different viewing angles can be relieved.

Specifically, as the liquid crystal display panel performs the progressive scan driving, when line n is scanned, the voltage level of a scanning signal on the scanning line Gn presents to be high while that of the scanning line Gn+1 is low, and thereby the thin film transistors TFT_A and TFT_B both turn on, and transistors TFT_C1 turns off. As such, under the action of a data signal on the data line Data, a liquid crystal capacitor Clc_A and a storage capacitor Cst_A of the main-area electrode, and a liquid crystal capacitor Clc_B and a storage capacitor Cst_B of the sub-area electrode all proceed to charge until the data signal voltage level is reached, such that both voltages of the main and sub area electrodes reach to a voltage level of the data signal. When line n+1 is scanned, the level of the scanning signal on the scanning line Gn turns to be low while that of the scanning line Gn+1 turns to be high, and the thin film transistors TFT_A and TFT_B thus both turn off while transistors TFT_C1 turns on. As such, the voltage of the sub-area electrode begins to change by means of a charge capacitance Cs1 so as to obtain a certain degree of difference from the voltage level of the main-area electrode. By means of such voltage difference, a lower color shift is accomplished.

In the method described above, the role of the charge capacitance Cs1 is critical, and the magnitude of the capacitance value determines the degree of the voltage difference between the main-area electrode and the sub-area electrode. It is set that $\Delta V\_B$ is the voltage difference between the main-area electrode and a common electrode, and $\Delta V\_A$ is the voltage difference between the sub-area electrode and the common electrode, the ratio wherebetween is below:

$$\Delta V\_B/\Delta V\_A = (Cst\_B + Clc\_B)/(Cst\_B + Clc\_B + 2Cs1).$$

Figure 2A:
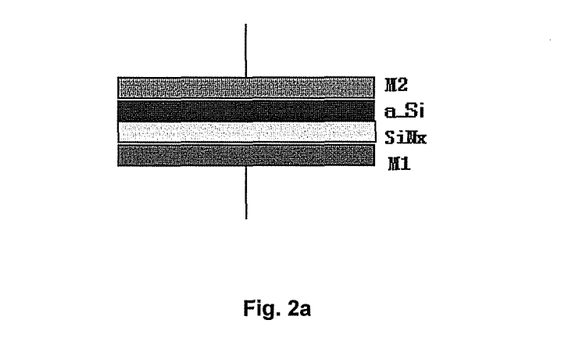
FIG. 2a is a schematic diagram of the structure of a charge capacitance in the prior art.
Figure 2B:
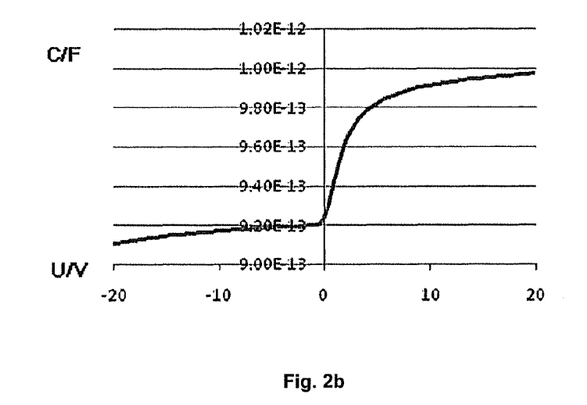

This ratio is a highly crucial parameter in the design, and it depends on the capacitance value of the charge capacitance Cs1. In the practical preparation, the structure of the capacitance Cs1 is generally as shown in FIG. 2a, wherein metal layers M1 and M2 act as both pole plates of the capacitance Cs1, and an SiN insulating layer and an a-Si amorphous silicon semiconductor layer are disposed therebetween. The metal layer M2 is connected to the thin film transistor TFT_C1, and the metal layer M1 is to the common electrode. The C-V characteristic curve of this capacitance is shown in FIG. 2b, which is characterized by that a capacitance value of the positive half cycle (under the positive polarity inversion driving period) is greater than that of the negative half cycle (under the negative polarity inversion driving period). An ideal solution of color shift is that the ratio in the positive polarity inversion driving period (the voltage level of the data signal is greater than that of the common electrode) is consistent with that of the negative inversion driving period (the voltage level in the data signal is lower than the common electrode voltage). However, since the capacitance value of the capacitance Cs1 in the positive half cycle is greater than that in the negative half cycle, the ratio during the positive polarity inversion driving period is thus less than the ratio during the negative inversion driving period, i.e., the ratios during the positive and negative polarity inversion driving periods are different. Such asymmetry may not only degrade the effect of decreased color shift over a wide angle gap, but also bring in, such as, the afterimage phenomenon.

SUMMARY OF THE INVENTION

With respect to the above problem, the present disclosure provides an array substrate, a liquid crystal display panel, and a driving method thereof for improving the effect of decreased color shift.

The present disclosure provides an array substrate, comprising:
 a common electrode;
 a plurality of scanning lines and a plurality of data lines;
 a plurality of pixel units configured in an array formed in a staggered pattern by the plurality of scanning lines and the plurality of data lines, wherein each of said pixel units is related to one of the scanning lines and one of the data lines, and includes a main electrode, a sub electrode, and a charge capacitance, and a first switch and a second switch, wherein a control terminal of each of the first and second switches is connected to the scanning line related to a present pixel unit; a first end of each of the first and second switches is connected to the data line related to the present pixel unit; and a second end of the first switch is connected to said main electrode and a second end of the second switch to said sub electrode;

a third switch, wherein a control terminal thereof is connected to the scanning line related to a pixel unit arranged in the next row of said present pixel unit according to the direction of scanning; a first end of the third switch is connected to the sub electrode; and a second end of the third switch is connected to the common electrode via the charge capacitance, the capacitance value of the charge capacitance during a negative polarity inversion driving period being less than the value during a positive polarity inversion driving period; and a compensation circuit unit, which is connected between the sub electrode and the scanning line related to the pixel unit arranged in the next row of the present pixel unit according to the direction of scanning, and is provided with a compensation capacitance for compensating the capacitance value of the charge capacitance during the negative polarity inversion driving period, such that a ratio of the voltage difference between the sub electrode and the common electrode to the voltage difference between the main electrode and the common electrode while said present pixel unit is during the positive polarity inversion driving period equals a ratio of the voltage difference between the sub electrode and the common electrode to the voltage difference between the main electrode and the common electrode while said present pixel unit is during the negative polarity inversion driving period.

According to an embodiment of the present disclosure, the above compensation circuit unit includes a fourth switch, a fifth switch, and said compensation capacitance. A control terminal of the fourth switch is connected to the scanning line related to a pixel unit arranged in the next row of the present pixel unit according to the direction of scanning; a first end of the fourth switch is connected to the common electrode via the compensation capacitance; and a second end of the fourth switch is connected to the sub electrode via the fifth switch, wherein the fifth switch turns off during the positive polarity inversion driving period and turns on during the negative polarity inversion driving period.

According to one embodiment of the present disclosure, the above fifth switch can be a switching diode, the anode of which is connected to the second end of the fourth switch, and the cathode of which is connected to the sub electrode.

According to another embodiment of the present disclosure, the above fifth switch can be a switching transistor, gate of which is connected to the second end of the fourth switch after a shorted connection with its drain, and the source of which is connected to the sub electrode.

According to an embodiment of the present disclosure, said switches are respectively thin film transistors.

In addition, the present disclosure further provides a liquid crystal display panel, including an array substrate, a color filter substrate, and a liquid crystal layer arranged between the array substrate and the color filter substrate, the array substrate comprising:

a common electrode;

a plurality of scanning lines and a plurality of data lines;

a plurality of pixel units configured in an array formed in a staggered pattern by the plurality of scanning lines and the plurality of data lines, wherein each of said pixel units is related to one of the scanning lines and one of the data lines and includes a main electrode, a sub electrode, and a charge capacitance, and a first switch and a second switch, wherein a control terminal of each of the first and second switches is connected to the scanning line related to a present pixel unit; a first end of each of the first and second switches is connected to the data line related to the present pixel unit; and a second end of the first switch is connected to said main electrode and a second end of the second switch to said sub electrode;

a third switch, wherein a control terminal thereof is connected to the scanning line related to a pixel unit arranged in the next row of the present pixel unit according to the direction of scanning; a first end of the third switch is connected to the sub electrode; and a second end of the third switch is connected to the common electrode via the charge capacitance, the capacitance value of the charge capacitance during a negative polarity inversion driving period being less that the value during a positive polarity inversion driving period; and a compensation circuit unit, which is connected between the sub electrode and the scanning line related to the pixel unit arranged in the next row of the present pixel unit according to the direction of scanning, and is provided with a compensation capacitance for compensating the capacitance value of the charge capacitance during the negative polarity inversion driving period, such that a ratio of the voltage difference between the sub electrode and the common electrode to the voltage difference between the main electrode and the common electrode while said present pixel unit is during the positive polarity inversion driving period equals a ratio of the voltage difference between the sub electrode and the common electrode to the voltage difference between the main electrode and the common electrode while said present pixel unit is during the negative polarity inversion driving period.

According to an embodiment of the present disclosure, the above compensation circuit unit includes a fourth switch, a fifth switch, and said compensation capacitance. A control terminal of the fourth switch is connected to the scanning line related to the pixel unit arranged in the next row of the present pixel unit according to the direction of scanning; a first end of the fourth switch is connected to the common electrode via the compensation capacitance; and a second end of the fourth switch is connected to the sub electrode via the fifth switch. The fifth switch turns off during the positive polarity inversion driving period and turns on during the negative polarity inversion driving period.

According to one embodiment of the present disclosure, the above fifth switch is a switching diode, the anode of which is connected to the second end of the fourth switch, and the cathode of which is connected to the sub electrode.

According to another embodiment of the present disclosure, the above fifth switch is a switching transistor, the gate of which is connected to the second end of the fourth switch after a shorted connection with its drain, and the source of which is connected to the sub electrode.

In addition, the present disclosure further provides a method of driving a liquid crystal display panel, comprising:

outputting, by a scan driving circuit, scanning signals line by line via scanning lines connected thereto;

outputting, by a data driving circuit, data signals via data lines connected thereto, comprising when there is a scanning signal in one scan line, turning on a switch of a main electrode and a switch of a sub electrode in a pixel unit related to said scanning line, such that a data signal in one data line is delivered to the main electrode and sub electrode of the related pixel unit to enable the main electrode and sub electrode to have the same level of voltage; and simultaneously, if the voltage of the data signal is higher than that of a common electrode, further turning on a sharing switch in a pixel unit related to the previous one of the scanning line, such that the voltage of the sub electrode in the pixel unit related to the previous one of the scanning line is varied by a charge capacitance, so as to differ from the voltage level of the main electrode; if the voltage of the data signal is lower than that of the common electrode, further turning on a sharing switch in a pixel unit related to the previous one of the scanning line and a compensation switch, such that the voltage level of the sub electrode in the pixel unit related to the previous one of the scanning line is varied by the charge capacitance and a compensation capacitance, so as to differ from the voltage level of the main electrode; and a ratio of the voltage difference between the sub electrode and the common electrode to the voltage difference between the main electrode and the common electrode during a period when the voltage of the data signal is higher than that of the common electrode equaling a ratio of the voltage difference between the sub electrode and the common electrode to the voltage difference between the main electrode and the common electrode during a period when the voltage of the data signal is lower than that of the common electrode.

Compared with the prior art, the present disclosure effectively compensates the capacitance value of the charge capacitance Cs1 which during the negative half cycle is relatively less than the value during the positive half cycle, by adding a compensation circuit including a compensation capacitance into each of the pixel units of the array substrate to act on the sub electrode of the pixel unit during the negative half cycle in which voltage level of the data signal is lower than the level of the common electrode, such that a ratio of the voltage difference between the sub electrode and a common electrode to the voltage difference between a main electrode and the common electrode during a positive polarity inversion driving period equals a ratio of the voltage difference between the sub electrode and the common electrode to the voltage difference between the main electrode and the common electrode during a negative polarity inversion driving period, and the liquid crystal display panel can thereby provide the effect of reduced color shift.

BRIEF DESCRIPTION OF THE DRAWINGS

Drawings here to provide further understanding of the present disclosure constitute a part of the specification and are also used to explain, not to be construed as limits to, the present disclosure in conjunction with embodiments of the disclosure, wherein:

FIG. 2b is a schematic diagram of the operating characteristic curve of the charge capacitance shown in FIG. 2a;

DETAILED DESCRIPTION OF THE EMBODIMENTS

The present disclosure is intended to add a compensation circuit unit to a pixel unit in a liquid crystal display panel using the charge sharing technology, which acts on the sub electrode of the pixel unit, such that a ratio of a voltage difference between the main area electrode and the common electrode against a voltage difference between the sub area electrode and the common electrode when the pixel unit is in the positive polarity inversion driving period equals a ratio of a voltage difference between the main electrode and the common electrode against a voltage difference between the sub electrode and the common electrode during the negative polarity inversion driving period.

The present disclosure will be described in detail in conjunction with the following detailed embodiments and accompanying drawings so as to enable the objective, technical solutions and advantages of the present disclosure to be more apparent.

Figure 3:
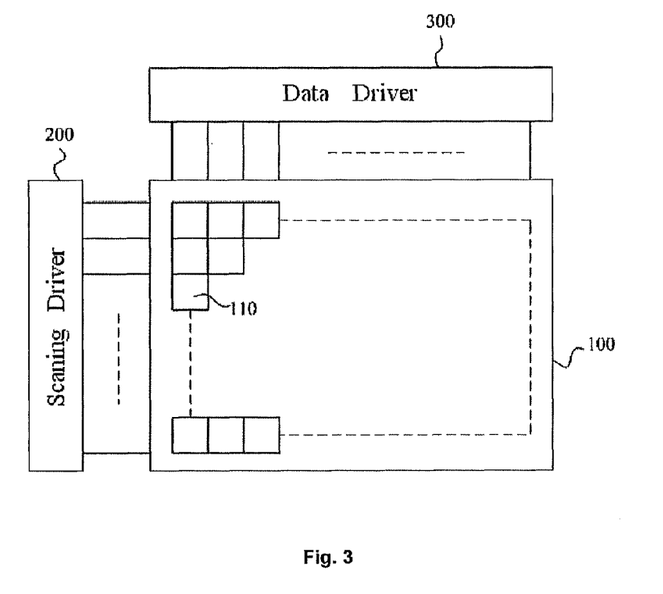
FIG. 3 is a schematic diagram of structural composition of an array, panel of one embodiment of the present disclosure.

FIG. 3 is a local schematic view of an array substrate according to one embodiment of the present disclosure. The array substrate may include an image display area 100, a scan driving circuit 200, and a data driving circuit 300. The image display area 100 may include an array of pixels formed in a staggered arrangement of a plurality of scanning lines and a plurality of data lines, and a plurality of pixel units 110 acting as elements of the array. All of the pixel units 110 may have the same structure, each including pixel electrodes comprising a main electrode and a sub electrode, and a charge capacitance Cs for sharing of the charge. A pixel unit Pn is taken as an example below to illustrate the circuit connection of the pixel unit in detail.

Figure 4:
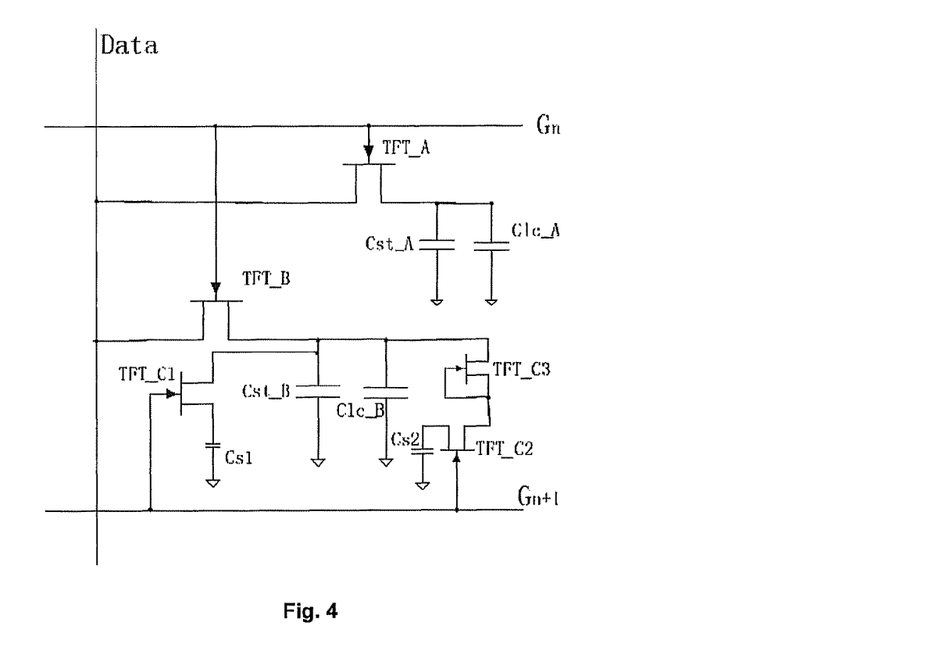
FIG. 4 is a schematic diagram of an equivalent circuit of a pixel unit of one embodiment of the present disclosure.

As shown in FIG. 4, the main electrode of the pixel unit Pn may be provided with a first switch TFT_A, wherein a first end of the first switch TFT_A is connected to a data line Data; a second end thereof is connected to the main electrode; and a control terminal is connected to a scanning line Gn. When the control terminal receives a scanning signal output from the scan driving circuit 200 through the scanning line Gn, the first and second ends of the first switch TFT_A may both turn on, and may deliver a data signal generated from the scan driving circuit 200 and received via the data line Data to the main electrode. On the other hand, a liquid crystal capacitor Clc_A and a storage capacitor Cst_A of the main area formed by coupling the main electrode with the common electrode may start to charge under the action of the data signal, such that the main electrode may have and may maintain a certain level of voltage of the main area.

The sub electrode of the pixel unit Pn may be provided with a second switch TFT_B, wherein a first end of the second switch TFT_B is connected to a data line Data; a second end thereof is connected to the sub electrode; and a control terminal connects to a scanning line Gn. When the control terminal receives a scanning signal output from the scan driving circuit 200 through the scanning line Gn, both of the first and second ends of the second switch TFT_B may turn on and enable the delivery of a data signal generated from the scan driving circuit 200 and received via the data line Data to the sub electrode. On the other hand, a liquid crystal capacitor Clc_A and a storage capacitor Cst_A of the sub area, which are formed by coupling the sub electrode with the common electrode, may start to charge under the action of the data signal, such that the sub electrode may have and may maintain a certain level of voltage of the sub area.

In addition, the sub electrode of the pixel unit Pn may be further configured with a third switch TFT_C1 and a charge capacitance Cs1, wherein a control terminal of the third switch TFT_C1 connects to a scanning line Gn+1; a first end of the third switch TFT_C1 is connected to the sub electrode; and a second end thereof may be connected to one of the electrodes of the charge capacitance Cs1, with the other electrode of the Cs1 being connected to the common electrode.

As described above, in order to obtain the effect of decreased color shift, the present disclosure may also provide a compensation circuit unit for the sub electrode. The compensation circuit unit may include a fourth switch TFT_C2, a fifth switch TFT_C3, and a compensation capacitance Cs2, wherein:

A control terminal of the fourth switch TFT_C2 is connected to the scanning line Gn+1; a first end of the fourth switch TFT_C2 is connected to the common electrode via the compensation capacitance Cs2; and a second end thereof is connected to the sub electrode via the fifth switch TFT_C3. The fifth switch TFT_C3 may function as follows: cutting off the connection between the sub electrode and the fourth switch TFT_C2 during the positive polarity inversion driving period; and conducting the connection between the sub electrode and the fourth switch TFT_C2 during the negative polarity inversion driving period.

Respective switches TFT_A, TFT_B, TFT_C1, TFT_C2, and TFT_C3 described above are preferably made of thin film transistors, wherein the control terminals of respective switches are configured to be the gate of the thin film transistors; each of the first ends is configured to be the source of the thin film transistor; and each of the second ends is arranged to be the drain of the thin film transistor, and wherein the gate and drain of the fifth switch TFT_C3 is in shorted connection. In other embodiments, respective switches may also be, triode transistors, Darlington transistors, and the like, which are not to be described here.

Figure 5A:
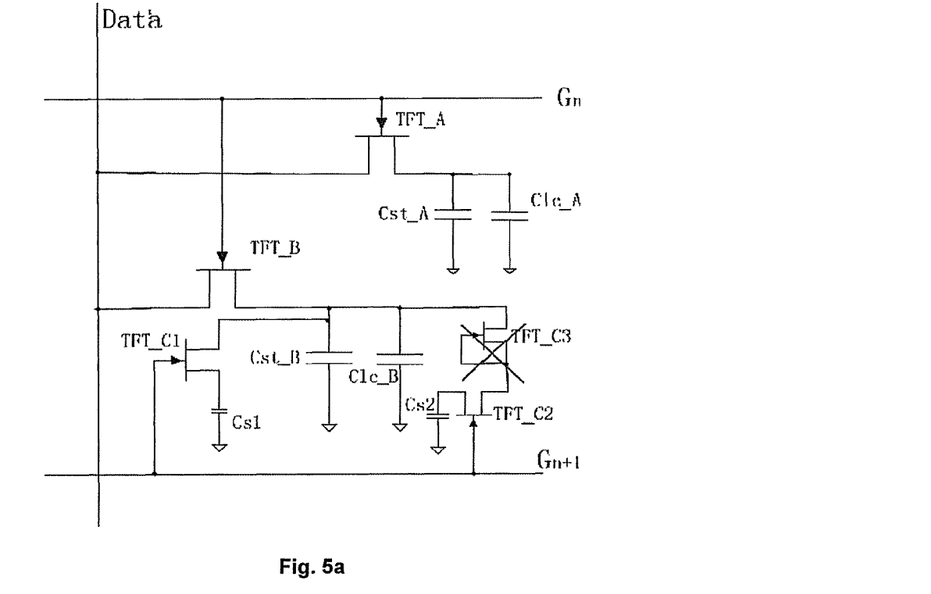
FIG. 5a is a schematic diagram of an equivalent circuit regarding the positive half cycle for the pixel unit shown in FIG. 4.

Detailed description with respect to the driving configuration of circuits in respective area of electrodes of the pixel, and the voltage transformation in respective area of electrodes of the pixel during the positive half cycle and the negative half cycle will be made as follows:

As shown in FIG. 5a, during the positive polarity inversion driving period (i.e., the positive half cycle), the voltage level of the data signal is higher than the voltage level of the common electrode, and the liquid crystal display panel sequentially inputs, along the direction of scanning, the scanning signals to the scanning lines. When scanning is proceeded to line Gn, the voltage of the scanning signal on the scanning line Gn presents to be high while that on the scanning line Gn+1 is low, and thereby the first switch TFT_A and the second switch TFT_B both turn on and the third switch TFT_C1 turns off, such that the data signals in the data line Data are passed to the related main electrode and sub electrode of the pixel unit respectively via the first switch TFT_A and the second switch TFT_B. Under the action of the data signals, the liquid crystal capacitor Clc_A and the storage capacitor Cst_A which are formed by coupling the main electrode with the common electrode, and the liquid crystal capacitor Clc_B and the storage capacitor Cst_B formed by coupling the sub electrode with the common electrode respectively proceed to charge, such that both of the main and sub electrodes may have and maintain the same data voltage which is higher than the voltage level of the common electrode. Thereafter, when scanning is proceeded to the next line of line Gn, that is, when scanning line Gn+1 is scanned, the voltage of the scanning signal on the scanning line Gn presents to be low while that on the scanning line Gn+1 is high, and thereby the first switch TFT_A and the second switch TFT_B both turn off but the third switch TFT_C1 and the fourth switch TFT_C2 turn on. Meanwhile, as during the positive polarity inversion driving period, the voltage level of the sub electrode is higher than that of the common electrode, the fifth switch TFT_C3 turns off. At this time, the sub electrode merely forms one current path to the common electrode via the third switch TFT_C1 and the charge capacitance Cs1. The voltage in the sub electrode is varied by means of charge sharing with the charge capacitance Cs1, and thus it is no longer the same as the voltage of the main electrode, whereby the technical effect of reduced color shift over a wide viewing angle is achieved.

Figure 5B:
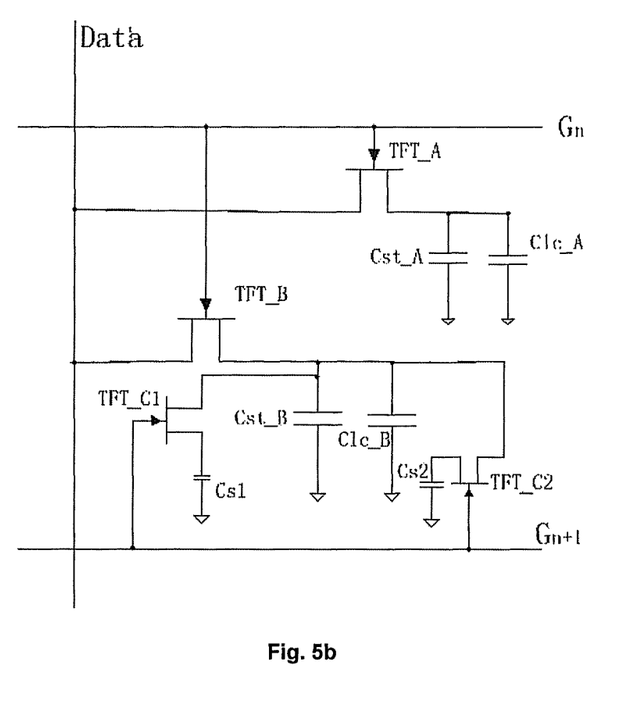
FIG. 5b is a schematic diagram of an equivalent circuit regarding the negative half cycle for the pixel unit shown in FIG. 4.

As shown in FIG. 5b, during the negative polarity inversion driving period (i.e., the negative half cycle), the voltage level of the data signal is lower than the voltage level of the common electrode, and the liquid crystal display panel sequentially inputs the scanning signals to the scanning lines along a direction of scanning. When scanning is proceeded to scanning line Gn, a voltage level of the scanning signal on the scanning line Gn presents to be high while that on the scanning line Gn+1 is low, and thereby the first switch TFT_A and the second switch TFT_B both turn on, and the third switch TFT_C1 turns off, such that the data signals in the data line Data are respectively delivered to the related main electrode and sub electrode of the pixel unit via the first switch TFT_A or the second switch TFT_B. Under the action of the data signals, the liquid crystal capacitor Clc_A and the storage capacitor Cst_A formed by the coupling of the main electrode with the common electrode, and the liquid crystal capacitor Clc_B and the storage capacitor Cst_B formed by the coupling of the sub electrode with the common electrode respectively proceed to charge, such that both of the main and sub electrodes may have and maintain the same data voltage which is lower than the voltage level of the common electrode. Thereafter, when scanning is proceeded to the next line of Gn, that is, when scanning line Gn+1 is scanned, the voltage of the scanning signal on the scanning line Gn presents to be low while the scanning signal on the scanning line Gn+1 is high, and thereby the first switch TFT_A and the second switch TFT_B both turn off but the third switch TFT_C1 and the fourth switch TFT_C2 turn on. Meanwhile, as during the negative polarity inversion driving period, the voltage level of the sub electrode is lower than that of the common electrode, the fifth switch TFT_C3 turns on. At this time, the sub electrode not only forms one current path to the common electrode via the third switch TFT_C1 and the charge capacitance Cs1, but also forms another current path to the common electrode via the fourth switch TFT_C2, the fifth switch TFT_C3 and the compensation capacitance Cs2. The voltage in the sub electrode changes by means of the charge sharing with the charge capacitance Cs1 and the compensation capacitance Cs2, and thus is no longer the same as the voltage of the main electrode, whereby the technical effect of reduced color shift over a wide viewing angle is achieved.

In this way, no matter during the positive polarity inversion driving period or the negative polarity inversion driving period, there is a certain degree of voltage difference generated between the main electrode and sub electrode in a pixel unit to enable the effect of reducing the color shift over a wide viewing angle. Moreover, as can be known from the above, the capacitance value of the charge capacitance Cs1 during the negative polarity inversion driving period is less than the capacitance value during the positive polarity inversion driving period, and therefore, employment of the compensation capacitance Cs2 to compensate the relatively less capacitance value of the charge capacitance Cs1 during the negative polarity inversion driving period can prevent the reduction of color shift over a wide viewing angle from being affected by some harmful effects caused by asymmetry of capacitance value between the positive and negative polarity inversion driving periods.

In addition, the present disclosure also provides a liquid crystal display panel, comprising:

the array substrate, the color filter substrate, and the liquid crystal layer arranged between the array substrate and the color filter substrate, as described above.

The present disclosure further provides a method of driving a liquid crystal display panel, comprising:

outputting, by a scan driving circuit, scanning signals line by line via scanning lines connected thereto;

outputting, by a data driving circuit, data signals via data lines connected thereto:

when there is a scanning signal in one scan line, turning on a switch of a main electrode (the first switch of the pixel unit in the embodiment) in a pixel unit related to said scanning line, and a switch of a sub electrode (the second switch of the pixel unit in the embodiment) in said pixel unit, such that a data signal in one data line is delivered to the main electrode and sub electrode of the related pixel unit to enable the main electrode and sub electrode to have the same voltage;

simultaneously, if the voltage of the data signal is higher than that of a common electrode (i.e., the positive half cycle), further turning on a sharing switch in a pixel unit related to the previous one of the scanning line (the third switch in the embodiment of the present disclosure) such that the voltage of the sub electrode in the pixel unit related to the previous one of the scanning line is varied by a charge capacitance so as to differ from the voltage of the main electrode; if the voltage of the data signal is lower than that of the common electrode (i.e., the negative half cycle), further turning on a sharing switch in a pixel unit related to the previous one of the scanning line (the third switch in the embodiment of the present disclosure) and a compensation switch (the fourth and fifth switches in the embodiment of the present disclosure), such that the voltage of the sub electrode in the pixel unit related to the previous one of the scanning line is varied by the charge capacitance and a compensation capacitance, so as to be different from the voltage of the main electrode; and a ratio of the voltage difference between the sub electrode and the common electrode to the voltage difference between the main electrode and the common electrode during the period when the voltage of the data signal is higher than that of the common electrode equaling a ratio of the voltage difference between the sub electrode and the common electrode to the voltage difference between the main electrode and the common electrode during the period when the voltage of the data signal is lower than that of the common electrode, so that the effect of reduced color shift can be obtained.

Although the above description embodies the preferred embodiments of the present disclosure, the scope of the present disclosure is not limited thereto. Any modification and alternation readily conceived by persons skilled in the art within the disclosed technical scope of the disclosure should fall into the protection scope of the present disclosure. Accordingly, the scope of the present disclosure should be defined only in accordance with the following scope of the claims and their equivalents.

The invention claimed is:

1. An array substrate, comprising:
a common electrode;
a plurality of scanning lines and a plurality of data lines;
a plurality of pixel units configured in an array formed in a staggered pattern by the plurality of scanning lines and the plurality of data lines, wherein each of said pixel units is related to one of the scanning lines and one of the data lines, and includes a main electrode, a sub electrode, and a charge capacitance, and a first switch and a second switch, wherein a control terminal of each of the first and second switches is connected to the scanning line related to a present pixel unit; a first end of each of the first and second switches is connected to the data line related to the present pixel unit; and a second end of the first switch is connected to said main electrode and a second end of the second switch to said sub electrode;

a third switch, wherein a control terminal thereof is connected to the scanning line related to a pixel unit arranged in the next row of said present pixel unit according to the direction of scanning; a first end of the third switch is connected to the sub electrode; and a second end of the third switch is connected to the common electrode via the charge capacitance, the capacitance value of the charge capacitance during a negative polarity inversion driving period being less than the value during a positive polarity inversion driving period; and a compensation circuit unit, which is connected between the sub electrode and the scanning line related to the pixel unit arranged in the next row of said present pixel unit according to the direction of scanning, and is provided with a compensation capacitance for compensating the capacitance value of the charge capacitance during the negative polarity inversion driving period, such that a ratio of the voltage difference between the sub electrode and the common electrode to the voltage difference between the main electrode and the common electrode while said present pixel unit is during the positive polarity inversion driving period, equals a ratio of the voltage difference between the sub electrode and the common electrode to the voltage difference between the main electrode and the common electrode while said present pixel unit is during the negative polarity inversion driving period.

2. The array substrate of claim 1, wherein:
the compensation circuit unit includes a fourth switch, a fifth switch, and said compensation capacitance,
wherein a control terminal of the fourth switch is connected to the scanning line related to the pixel unit arranged in the next row of said present pixel unit according to the direction of scanning; a first end of the fourth switch is connected to the common electrode via the compensation capacitance; and a second end of the fourth switch is connected to the sub electrode via the fifth switch, the fifth switch turning off during the positive polarity inversion driving period and turning on during the negative polarity inversion driving period.

3. The array substrate of claim 2, wherein:
the fifth switch is a switching diode, the anode of which is connected to the second end of the fourth switch, and the cathode of which is connected to the sub electrode.

4. The array substrate of claim 2, wherein:
the fifth switch is a switching transistor, the gate of which is connected to the second end of the fourth switch after a shorted connection with its drain, and the source of which is connected to the sub electrode.

5. The array substrate of claim 1, wherein:
said switches are respectively thin film transistors.

6. The array substrate of claim 2, wherein:
said switches are respectively thin film transistors.

7. A liquid crystal display panel, including an array substrate, a color filter substrate, and a liquid crystal layer arranged between the array substrate and the color filter substrate, the array substrate comprising:

a common electrode;

a plurality of scanning lines and a plurality of data lines;

a plurality of pixel units configured in an array formed in a staggered pattern by the plurality of scanning lines and the plurality of data lines, wherein each of said pixel units is related to one of the scanning lines and one of the data lines, and includes a main electrode, a sub electrode, and a charge capacitance, and a first switch and a second switch, wherein a control terminal of each of the first and second switches is connected to the scanning line related to a present pixel unit; a first end of each of the first and second switches is connected to the data line related to the present pixel unit; and a second end of the first switch is connected to said main electrode and a second end of the second switch to said sub electrode;

a third switch, wherein a control terminal thereof is connected to the scanning line related to a pixel unit arranged in the next row of said present pixel unit according to the direction of scanning; a first end of the third switch is connected to the sub electrode; and a second end of the third switch is connected to the common electrode via the charge capacitance, the capacitance value of the charge capacitance during a negative polarity inversion driving period is less than the value during a positive polarity inversion driving period; and a compensation circuit unit, which is connected between the sub electrode and the scanning line related to the pixel unit arranged in the next row of said present pixel unit according to the direction of scanning, and is provided with a compensation capacitance for compensating the capacitance value of the charge capacitance during the negative polarity inversion driving period, such that a ratio of the voltage difference between the sub electrode and the common electrode to the voltage difference between the main electrode and the common electrode while said present pixel unit is during the positive polarity inversion driving period, equals a ratio of the voltage difference between the sub electrode and the common electrode to the voltage difference between the main electrode and the common electrode while said present pixel unit is during the negative polarity inversion driving period.

8. The liquid crystal display panel of claim 7, wherein:

the compensation circuit unit includes a fourth switch, a fifth switch, and said compensation capacitance, wherein a control terminal of the fourth switch is connected to the scanning line related to the pixel unit arranged in the next row of said present pixel unit according to the direction of scanning; a first end of the fourth switch is connected to the common electrode via the compensation capacitance; and a second end of the fourth switch is connected to the sub electrode via the fifth switch, the fifth switch turning off during the positive polarity inversion driving period and turning on during the negative polarity inversion driving period.

9. The liquid crystal display panel of claim 8, wherein:

the fifth switch is a switching diode, the anode of which is connected to the second end of the fourth switch, and the cathode of which is connected to the sub electrode.

10. The liquid crystal display panel of claim 8, wherein:

the fifth switch is a switching transistor, the gate of which is connected to the second end of the fourth switch after a shorted connection with its drain, and the source of which is connected to the sub electrode.

11. A method of driving a liquid crystal display panel, comprising:

outputting, by a scan driving circuit, scanning signals line by line via scanning lines connected thereto;

outputting, by a data driving circuit, data signals via data lines connected thereto, comprising:

when there is a scanning signal in one scan line, turning on a switch of a main electrode and a switch of a sub electrode in a pixel unit related to said scanning line, such that a data signal in one data line is delivered to the main electrode and sub electrode of the related pixel unit to enable the main electrode and sub electrode to have the same level of voltage; and simultaneously, if the voltage of the data signal is higher than that of a common electrode, further turning on a sharing switch in a pixel unit related to the previous one of the scanning line, such that the voltage of the sub electrode in the pixel unit related to the previous one of the scanning line is varied by a charge capacitance so as to differ from the voltage level of the main electrode; if the voltage of the data signal is lower than that of the common electrode, further turning on a sharing switch in a pixel unit related to the previous one of the scanning line, and a compensation switch, such that the voltage level of the sub electrode in the pixel unit related to the previous one of the scanning line is varied by the charge capacitance and a compensation capacitance, so as to differ from the voltage level of the main electrode; and a ratio of the voltage difference between the sub electrode and the common electrode to the voltage difference between the main electrode and the common electrode during a period when the voltage of the data signal is higher than that of the common electrode equaling a ratio of the voltage difference between the sub electrode and the common electrode to the voltage difference between the main electrode and the common electrode during a period when the voltage of the data signal is lower than that of the common electrode.

* * * * *